United States Patent [19]

Merkler

[11] Patent Number: 4,841,807
[45] Date of Patent: Jun. 27, 1989

[54] SEMI-FLOATING DIFFERENTIAL PINION GEAR AND LUBRICATION THEREOF

[75] Inventor: Michael B. Merkler, Fort Wayne, Ind.

[73] Assignee: Navistar International Transportation Corp., Chicago, Ill.

[21] Appl. No.: 170,178

[22] Filed: Mar. 18, 1988

[51] Int. Cl.[4] .............................................. F16H 1/40
[52] U.S. Cl. ....................................... 74/710; 74/713; 74/467
[58] Field of Search ...................... 74/710, 710.5, 711, 74/713, 467

[56] References Cited

U.S. PATENT DOCUMENTS

| | | | |
|---|---|---|---|
| 1,776,677 | 9/1930 | Brewer | 74/713 |
| 3,306,130 | 2/1967 | Salzmann | 74/710.5 |
| 3,365,984 | 1/1968 | Musgrave | 74/713 |
| 3,435,905 | 7/1969 | Schmid | 74/710.5 X |
| 3,444,960 | 5/1969 | Killius et al. | 74/710.5 X |
| 3,448,635 | 6/1969 | Nelson | 74/710.5 |
| 3,470,768 | 10/1969 | Ford et al. | 74/713 |
| 3,532,183 | 10/1970 | Shealy | 74/713 X |
| 3,974,717 | 8/1976 | Breed et al. | 74/713 |
| 4,084,450 | 4/1978 | Conroy | 74/710 X |
| 4,261,219 | 4/1981 | Suzuki et al. | 74/710 |

FOREIGN PATENT DOCUMENTS

| | | | |
|---|---|---|---|
| 58-207549 | 12/1983 | Japan | 74/713 |
| 59-1870 | 1/1984 | Japan | 74/713 |

*Primary Examiner*—Dwight G. Diehl
*Attorney, Agent, or Firm*—F. David Aubuchon; Dennis K. Sullivan

[57] ABSTRACT

An automotive differential is provided with pinion gears which are rotatably mounted in the differential housing. The differential housing is further provided with radially extending lubricant passages intersecting the pinion gear bores. Grooves or recesses on the rotating pinion bearing surfaces remove oil from the lubricant passages to provide lubrication of the bearing surfaces of the pinion gears. A conical thrust bearing is provided between the pinion and the differential housing to maintain stability of the pinion gear. Preferably, the lubricant passages extend from the interior cavity of the differential to the exterior to provide better recirculation of the oil through the interior cavity to provide improved cooling of the differential and prevent the lubricant from reaching excessive temperatures.

11 Claims, 1 Drawing Sheet

SEMI-FLOATING DIFFERENTIAL PINION GEAR AND LUBRICATION THEREOF

This invention relates to an automotive differential and, more particularly, to semi-floating pinion gears in the differential journalled in the housing and lubricant passages to provide lubrication and cooling of the pinion gears and the differential.

THE PRIOR ART

The conventional automotive differential is driven through a four-legged spider cross shaft, that is clamped between a flanged half and a plain half of the differential housing. A spider gear is carried on each leg of the spider cross shaft and the spider gear rotates on this shaft. A spherical thrust washer adjacent to the differential housing receives load from the spider gear when the spider gear rotates. The spider gear rotates when there are different speeds between the driving axles as when cornering or when one wheel is on ice and is called differential action. When there is no differential action, the spider gears do not rotate. The spider gears drive the side gears which are connected to drive axles for driving the vehicle. Generally, the differential is driven by a pinion on the propeller shaft which engages a ring gear on the differential housing. As the differential housing is rotated, the side gears are also rotated which in turn drives the axles for driving the vehicle. Generally this design of a differential operates satisfactorily; however, one of the problems of this design is when the spider gear rotates on the spider shaft at extreme speeds, due to a lack of sufficient lubrication, the spider gear can weld itself to the spider shaft or cause excessive wear, and at extreme impact due to the power from the engine, the spider shaft breaks occasionally and causes failure of the spider gears. Accordingly, this invention is designed to overcome these problems.

The U.S. Pat. No. 3,365,984 to Musgrave shows a differential which is similar to the present invention in the mounting of the pinion gears in the differential housing but does not provide for any special lubrication or cooling of the gears which is desirable when the gears are rotating. Brewer U.S. Pat. No. 1,776,677 and Ford U.S. Pat. No. 3,470,768 are similar in this regard.

SUMMARY OF THE INVENTION

The present invention also provides for elimination of the spider shaft and the mounting of the pinion gears and side gears on their periphery in the differential housing. In addition to this improvement, lubricant passages and grooves are provided respectively in the differential housing and on the bearing surfaces of the pinion gears to provide lubrication of the bearing surfaces. This will eliminate the possibility of welding the gears in their bearings. Additionally, the lubricant passages in the differential housing provide recirculation between the interior of the differential housing and the axle housing and thus provide increased lubrication and cooling of the pinion gears, side gears, and differential housing interior during normal operation.

Accordingly, it is an object of the invention to provide an automotive differential having semi-floating pinion gears peripherally mounted in the differential housing for engagement with side gears on axle shafts to provide a differential action.

It is a further object of this invention to provide an automotive differential having peripherally mounted pinion gears on the differential housing wherein lubricant passages and grooves are provided in the housing and on the bearing surfaces of the gears for lubricating and cooling the pinion gears and improving lubricant circulation between the differential gear cavity and the axle housing.

The objects of this invention are accomplished by a differential having a housing forming bearing surfaces for the pinion gears which engage side gears to drive the drive axles. The spider shaft normally used in the differential is eliminated and the sole bearing support for the pinion gears is the differential housing. Lubricating oil is provided in the central cavity of the axle housing which contains the differential mechanism to provide an oil reservoir surrounding the differential. When the differential is operating, oil flows out of the housing through radially extending arcuate lubricant passages intersecting the pinion gear bores in the differential housing. Grooves or recesses on the rotating pinion gears remove oil from the lubricant passages to provide lubrication of the bearing surfaces of the pinion gears which are much larger than in the conventional differential. A conical thrust washer is provided between each of the pinion gears and the differential housing to maintain stability of the pinion gear. The lubricant passages provide for better recirculation of the oil into the differential housing interior to provide improved cooling of the differential and preventing the lubricant from reaching excessive temperatures.

DESCRIPTION OF THE DRAWINGS

Referring to the drawings.

DETAILED DESCRIPTION OF THE PREFERRED EMBODIMENT

Figure 2:
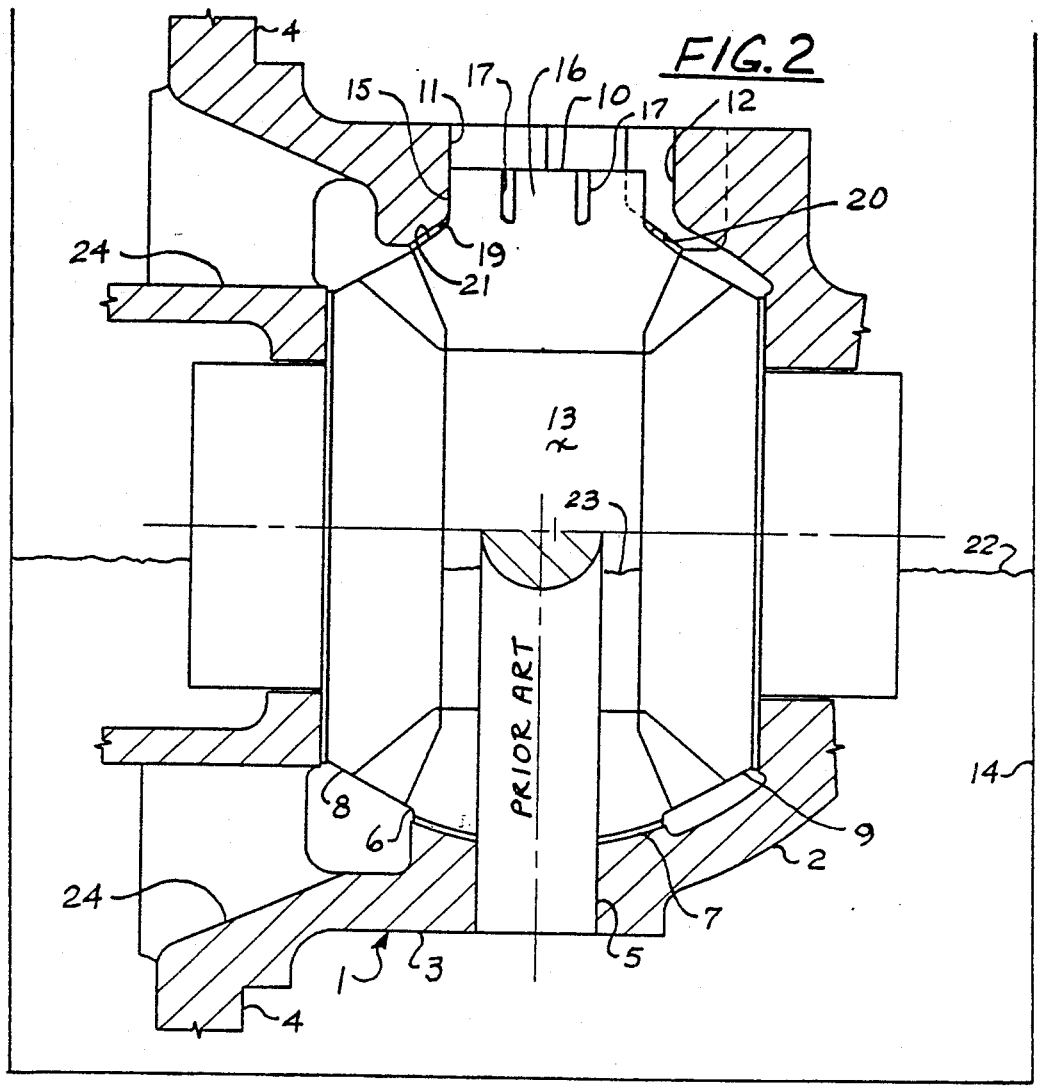
FIG. 2 is a cross-sectional elevation view of a portion of the differential taken on line 2—2 of FIG. 1 and illustrating the invention above the horizontal center line and the prior art below the centerline.

Referring to the drawings, a conventional automotive differential 1 is shown in the lower half of FIG. 2 and includes a plain half housing 2 and a flanged half housing 3. The flanged half housing 3 is formed with a ring gear (not shown) extending from the flange 4 to be driven by a pinion drive gear on a propeller shaft. The two halves of the housing are bolted in a suitable manner to integrally lock the housings together as a unit. Oil passages 24, which may have exterior scoops, extend axially through the flanged half 3 for the purpose of allowing lubricating oil to enter the cavity 13 within the housing.

A spider shaft 5 is bolted between the half housings 3 and 2 and forms a cross configuration with a pinion gear 6 mounted on each leg of the spider shaft. A spherical thrust bearing 7 is disposed between the pinion gear 6 and the housing 1. The pinion gears each engage side gears 8 and 9 which are connected to drive axle shafts which drive the vehicle. Differential action is provided by the pinion gears engaging the side gears which are permitted to rotate and provide differential action when the vehicle is cornering and one drive axle shaft is rotating at a greater speed than the other. The shortcoming of this design is that the pinion gear on the spider shaft forms a small bearing surface and is not adequately lubricated and cooled causing excessive wear and welding. Accordingly the improved design is shown in the upper half of FIG. 2.

In the improved design, each pinion gear 10 has an integral shaft 15 journalled in a bore 11 formed by the housing halves 2 and 3. The pinion gear 10 engages the side gears 8 and 9. Normally four pinion gears are used to engage the side gears 8 and 9 and all of the pinion gears provide differential action allowing differential rotation between the side gears 8 and 9 when the vehicle is cornering.

A pair of diametrically opposed, radially extending (relative to the housing axis) passages in the form of scalloped or arcuate pockets intersecting the periphery of the bore 11 establish communication between the internal cavity 13 within the differential housing and the axle casing 14 containing the oil reservoir. The arcuate pockets 12 are disposed along a diameter of bore 11 perpendicular to the direction of rotation of the differential and are thus in a relatively unloaded location in the bore 11. When the differential is rotating, oil flows out of cavity 13 through the passages 12 due to centrifugal force while replacement oil enters the cavity through passages 24 from the oil reservoir 14 surrounding the housing 1. The flow through the lubricant passages 12 thus cools the pinion gears 10, side gears and the housing halves 2 and 3.

The shaft 15 of pinion gear 10 is formed with a bearing surface 16 having grooves or recesses 17 formed on its periphery which cause lubricant drawn from lubricant passages 12 to enter the bearing formed by bearing surface 16 and the surface of the bore 11 in the housing to provide lubrication of the pinion gear. The pinion gear 10 is also mounted on a conical thrust bearing 19 which seats on a conical surface 20 formed in the housing and engages a mating conical surface 21 on the pinion gear. The specific angle of this conical surface is as steep as possible to stabilize the pinion gear when it is in the driving the mode but not so steep as to eliminate its effectiveness as a thrust bearing to resist the separation forces between the pinion gears and side gears caused by the rotation of the pinion gears. The ideal angle is believed to be 90 degrees to the pitch angle of the pinion gear with 10 degrees tolerance in either direction.

Figure 1:
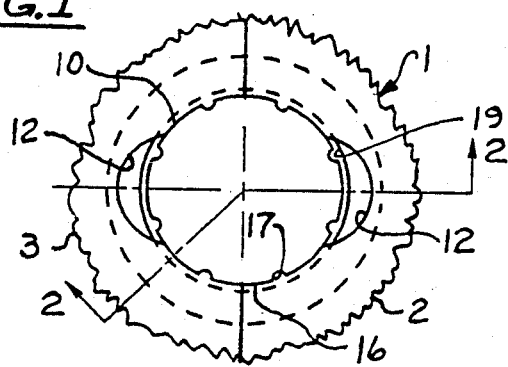
FIG. 1 illustrates an end view of a portion of a differential taken axially of one pinion gear.

FIG. 1 shows an end view of the differential with the lubricant passages in the housing and lubricating grooves or recesses on the bearing surface of the pinion gear. It can be seen that the lubrication passages 12 result in the thrust bearing 19 being unsupported at the passages 12. However, this is not considered to be particularly detrimental and may improve thrust bearing lubrication. As mentioned previously, three other pinion gears may be used to provide the differential action for the side gears. In light load applications, however, two pinion gears may be adequate to provide the differential action necessary while carrying the load of the differential in driving the vehicle.

The device operates in the following described manner. The differential 1 is driven through a conventional ring gear (not shown) on the flange 4 by a drive pinion on a propeller shaft of the vehicle and is designed to work in the main drive wheel differential and also in the power divider differential within the forward rear axle of a tandem axle in heavy trucks. The differential operates in a casing 14 and is immersed in oil, the oil level being indicated at the level 22 forming a reservoir outside the differential housing 1. Similarly the oil level 23 is shown in the cavity 13 inside the differential and is at the same level at rest due to flow through passages 24. The oil reservoir provides for lubrication of the differential and gears thereinside as well as cooling of the differential during normal operation. As the differential is driven, the pinion gears 10 drive the side gears 8 and 9 and drive axles at a constant rotation if the vehicle is moving straight ahead. If the vehicle is cornering, differential action is needed for the side gears 8 and 9. With one side gear rotating at a greater rotational velocity than the other, the pinion gears rotate allowing the one axle shaft to rotate at a greater speed than the other. As the differential housing rotates, oil is thrown out of the cavity 13 by centrifugal force through the lubricant passages 12, cooling the pinion gears 10 and the differential housing, while oil enters the cavity 13 through axial passages 24. The oil passing through the lubricant passages 12 enters the recesses 17 during differential action and is carried to the bearing surface in bore 11 for the pinion gear to provide lubrication thereof. It can be seen that the provision of the lubricant passages 12 provides improved oil recirculation between the internal cavity 13 and the axle housing 14 and thus better cooling and lubrication of the differential and gears thereinside.

The embodiments of the invention in which an exclusive property or privilege is claimed are defined as follows:

1. An automotive vehicle differential comprising a differential housing having an inner cavity and defining axially aligned openings, side gears rotatably received in said openings for driving drive shafts, said differential housing having lubricant apertures extending in an axial direction through said housing into said cavity, a differential drive mechanism including pinion gears for engaging said gears, bearings formed in said differential housing rotatably supporting said pinion gears, means defining lubricant passages in said housing extending radially relative to the axis of said side gears for recirculating oil exteriorly of said housing for cooling and lubricating said gears and differential when said differential is operating.

2. A vehicle differential as set forth in claim 1 including a conical thrust bearing on each of said pinion gears, said conical thrust bearing being disposed at about 90° to the pitch angle of said pinion gears.

3. A differential comprising a differential housing defining axially aligned openings, a side gear received in each of said openings for driving a drive shaft, said housing defining an inner cavity, a differential drive mechanism received in said cavity including pinion gears meshing with said side gears, said pinion gears having bearing surfaces, cylindrical bearing bores formed about a radial axis in said housing and receiving said bearing surfaces of said pinion gears, radial lubricant passage means extending from said cavity adjacent to and intersecting one of said bearing bores, and lubricant recesses formed on said bearing surfaces of said pinion gears for lubricating said bearing bores.

4. A differential as set forth in claim 3 including a conical thrust bearing aligning each of said pinion gears for meshing with said side gears.

5. A differential as set forth in claim 3 wherein said housing includes 2 halves fastened together, one of said halves defining a flanged half forming a ring gear, the other half of said housing defining a plain half to fasten together with the flanged half to form bearings for said pinion gears, said housing having generally axially extending oil passages said flanged half.

6. A differential as set forth in claim 5 and means defining a oil-receiving casing surrounding said differential, said differential causing oil to flow through said radial lubricant passage means and recirculating oil between said cavity and said casing.

7. A differential as set forth in claim 3 and said radical lubricant passage means comprising a pair of diametrically opposed lubricant passages intersecting said bores along a diameter thereof disposed perpendicular to the axis of rotation of said differential.

8. An axle comprising a casing containing oil, a differential housing disposed within said casing defining a central cavity and coaxially aligned openings in communication therewith, a side gear supported in each of said openings for driving a drive shaft, a differential drive mechansim including pinion gears meshing with said side gears received in said cavity, means in said differential housing forming bearing bores disposed normally to the side gear openings and rotatably supporting bearing surfaces on said pinion gears, said housing having radially extending lubricant passages adjacently intersecting said bearing bores and establishing oil communication between said cavity and said axle casing.

9. An axle as set forth in claim 8 and said differential housing having oil apertures establishing oil communication between said casing and said cavity in addition to said lubricant passages.

10. An axle as set forth in claim 9 and said lubricant passages being disposed to intersect said bearing bores at locations thereof perpendicular to the axis of rotation of said differential.

11. An axle as set forth in claim 9 and axial grooves being disposed on said pinion gear bearing surfaces and disposed to carry lubricant to said housing.

* * * * *